United States Patent [19]

Suresky

[11] Patent Number: 4,707,369
[45] Date of Patent: Nov. 17, 1987

[54] PROCESS FOR TREATING WET FAT BIOLOGICAL TISSUE USING A WATER MISCIBLE SOLVENT

[75] Inventor: Arnold Suresky, Colonia, N.J.

[73] Assignee: Faraday Laboratories, Inc., Hillside, N.J.

[21] Appl. No.: 898,012

[22] Filed: Aug. 19, 1986

Related U.S. Application Data

[63] Continuation-in-part of Ser. No. 582,960, Feb. 23, 1984, abandoned.

[51] Int. Cl.$^4$ .......................... A23B 4/04; A23L 3/00
[52] U.S. Cl. .................................. 426/417; 426/426; 426/429; 426/480; 260/412.8
[58] Field of Search ............... 426/417, 422, 423, 426, 426/429, 428, 480, 493; 260/412.8

[56] References Cited

U.S. PATENT DOCUMENTS

| | | | |
|---|---|---|---|
| 2,539,544 | 1/1951 | Levin et al. | 426/429 X |
| 2,972,542 | 2/1961 | Levin | 426/429 X |
| 3,628,967 | 12/1971 | Toussaint | 426/426 |
| 3,649,294 | 3/1972 | Thijssen | 426/417 |
| 3,687,819 | 8/1972 | Levin | 426/426 X |
| 3,879,370 | 4/1975 | Carpenter et al. | 426/429 X |
| 4,460,476 | 7/1984 | McCaffrey et al. | 210/689 |

OTHER PUBLICATIONS

Perry, J. H., "Chemical Engineers' Handbook", McGraw-Hill Book Co., Inc., N.Y. 1950, p. 633.

*Primary Examiner*—Robert Yoncoskie
*Attorney, Agent, or Firm*—Burmeister, York, Palmatier, Hamby & Jones

[57] ABSTRACT

The process of simultaneously defatting and dehydrating raw fat animal tissue and other tissues in comminuted form by introducing the tissue particles into a boiling alcohol solvent, the fat of the tissue and water of the tissue being extracted into the body of boiling alcohol to form a slurry of alcohol, particles, fat and water. The water of the tissue and alcohol in an azeotropic vapor form are distilled off from the body of slurry and separated in a subsequent distillation to recover the alcohol for recycling. When sufficient water is removed from the slurry, the solids are separated from the liquids of the slurry, and the alcohol is evaporated from the fat. The recovered alcohol is dehydrated to less than 5% water by volume, and returned to the mass of alcohol.

10 Claims, 3 Drawing Figures

PROCESS FOR TREATING WET FAT BIOLOGICAL TISSUE USING A WATER MISCIBLE SOLVENT

This application is a continuation-in-part of application Ser. No. 582,960 filed Feb. 23, 1984, now abandoned.

This invention relates generally to processes for separating fat from tissue and apparatus utilizing such processes. In particular, it relates to processes and apparatus for producing dried particles of defatted animal tissue.

It has long been recognized that there are many substances, particularly of animal origin such as glandular tissue, meat, and the like, which contain valuable constituents, either for food or pharmaceutical use. Such tissues, however, contain relatively high percentages of water present either in the form of intercellular fluid or intracellular fluid. Removal of water from such tissues has proven difficult, and without the removal of water, it has been difficult to remove the fat of such tissues. Both the fat and water of such tissues must be removed to produce a stable product, and a product which may be further processed.

Water has been removed from tissue by evaporation, either at low temperatures over a long period of time, or at higher temperatures over a shorter period of time, but such efforts have produced products of low food value with many biological values completely destroyed.

Wet fat animal tissue has been successfully disiccated and defatted by a process of comminuting animal tissue, suspending the tissue in a slurry with a water immiscible solvent which forms an azeotrope with water, evaporating the solvent and water from the slurry as an azeotrope, condensing the azeotrope vapors to separate the solvent, and replenishing the organic solvent used in the process with the recovered solvent, as disclosed in U.S. Pat. No. 2,503,312 of Worsham and Levin entitled SIMULTANEOUS DEFATTING AND DEHYDRATING OR FATTY SUBSTANCES, U.S. Pat. No. 2,503,313 of Ezra Levin entitled PRODUCTION OF DRY DEFATTED ENZYMATIC MATERIAL, and U.S. Pat. No. 2,539,544 of Levin and Worsham entitled SIMULTANEOUS DEFATTING AND DEHYDRATING FATTY SUBSTANCES.

The water immiscible fat solvent generally used in the processes indicated above is a hydrocarbon solvent, particularly, ethylene dichloride. Such solvents must be removed from end products which are intended to be used for human consumption, and there is a growing belief that the presence of more than mere traces of such solvents in animal feed is objectionable. The removal of all traces of a fat solvent from the product is extremely difficult, and a better solution would appear to be the use of a solvent which is not considered to be injurious to the health of individuals.

Traces of alcohol in a product are not considered to be injurious to the health of an individual consuming the product, or objectionable in animal feed. Further, alcohol can generally be removed by the application of heat to levels which are acceptable. For this reason, alcohol is an attractive solvent for the removal of fat and moisture from animal tissues.

The book, *Fishery Byproducts Technology* by Julius Brody, AVI Publishing Company, Inc. 1965, West Port, Conn., describes two processes for removing fat and moisture from fish by the use of alcohol. The one process uses three separate stages, the first of which is to treat fish with acetone, and dry the product. The second stage treats the product with 90% ethyl alcohol and heat, and therafter dries the product. The third stage treats the product with boiling 90% alcohol and dries the product. this process is more fully described in British Pat. No. 727,072.

The second process described in *Fishery Byproducts Technology*, is attributed to A. Gutman and F. A. Vandenhenvel and uses ispropanol to extract fat and water from press-cake formed of fish offal. The isopropanol is used hot, drained from the cake after extraction, and the cake dried under vacuum. Isopropanol is recovered by distillation from the fish oil and reused in the process. Such plants have not proven to be commercially successful. An economic disadvantage of such plans is that the fish oil produced by the process is difficult to separate from the water removed from the fish and solvent.

Another process for dehydrating and defatting animal tissue using a water miscible fat solvent is disclosed by Thijssen in U.S. Pat. No. 3,649,294 entitled PROCESS FOR DEHYDRATING, DEFATTING AND DEODORINZING ANIMAL TISSUE. In the Thijssen process, vapors of a water miscible solvent such as acetone, ethanol, and isopropanol contact comminuted animal tissue in a countercurrent flow to dehydrate the tissue, and the same or another solvent in liquid state is utilized to defat the tissue. In the Thijssen process, the fat solvent contains significant amounts of water, such as isopropanol vapors having a water content of about 15% by weight.

There have been extensive efforts to develop suitable solvent extraction methods for raw tissue, particularly for the production of fish protein concentrate. In December 1970, Roland Finch, Director of the National Center for Fish Protein Concentrate, Bureau of Commercial Fisheries, U.S. Department of Interior, Washington, D.C., published "Fish Proteins for Human Foods" in *CRC Critical reviews in Food Technology*, and in Table 8 listed twenty solvent extraction methods which had been applied to the production of fish protein concentrate, including those described above. Among the processes described is the use of isopropyl alcohol by H. E. Power, as more fully described in "Characteristics and Nutritional Value of Various Fish Protein Concentrates", *J. Fish Red. Bd. Can.*, 21, 1486, 1964.

The known processes for extracting raw tissue with isopropyl alcohol have resulted in the necessity of separating the water, solvent and oil from the extract in order to recover the solvent for use. This has proven to be a cost disadvantage of such processes. Further, conventional extraction with isopropyl alcohol requires the tissue to remain in contact with isopropyl alcohol for longer periods than desired, since it is desired to leave in the tissue particles as large as proportion of protein and water solubles as possible.

The azeotropic processes of Levin for defatting and dehydrating tissue particles achieve economical separation of the solvent from the water and oil, and retain the biological values in the tissue, but requires the use of a water immiscible solvent, and generally a toxic solvent.

It is an object of the present invention to provide a process for dehydrating and defatting animal tissue in which the disadvantags of prior processes are greatly reduced or eliminated.

It is a further object of the present invention to provide a process for defatting and dehydrating wet biological tissue utilizing a single solvent, particularly alcohol.

It is still a further object of the present invention to provide a process for dehydrating and defatting wet biological tissue wherein the bioloical values of the tissue are substantially preserved therein.

It is a still further object of the present invention to provide a process for defatting and dehydrating biological tissue utilizing azeotropic distillation of an alcohol solvent.

The foregoing objects of the invention are achieved by the process of comminuting the wet fat biological tissue and thereafter introducing the particles of tissue into a body of boiling water miscible solvent to form a slurry of solvent, particles and water, and maintaining the tissue in suspension in the slurry for a period of time sufficient to reduce the water content of the tissue to less than 10% by weight. The slurry is maintained under boiling conditions and the particles are maintained suspended in the slurry. Vapor of solvent and water is withdrawn from the slurry, thereby reducing the content of water in the tissue, and fresh solvent is introduced into the slurry to replace the solvent withdrawn in the vapor. The solvent-water content of the added solvent by volume is maintained at least 95% alcohol during the period of time the tissue particles remain in the slurry.

Applicant's novel apparatus for carrying out the process described above is illustrated in the attached drawings, in which.

Figure 1:
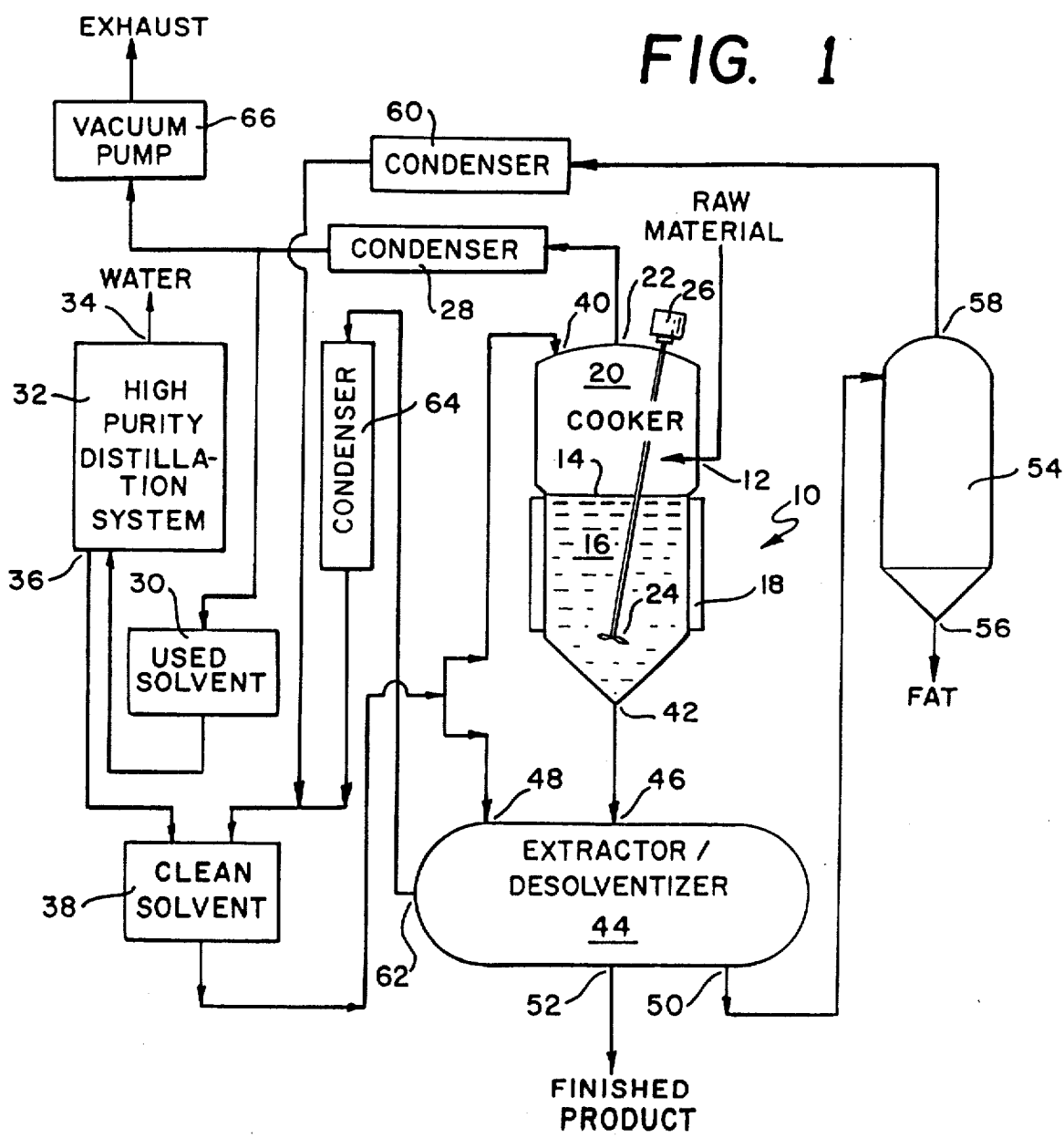
FIG. 1 is a schematic drawing of a plant for commercial production of desiccated and defatted animal tissue according to the present invention.

The process of the present invention is an improvement upon the processes described in the patent of Worsham and Levin, U.S. Pat. No. 2,503,312 and the patent of Levin, U.S. Pat. No. 2,503,313, referred to above, in that a vessel partially filled with a fat solvent is employed, and comminuted particles of the tissue are introduced into a boiling mass of solvent to form a slurry of solvent, particles and water. The slurry only partially fills the vessel, and vapors in the form of an azeotrope of the solvent and water from the tissue particles develop in the space above the level of the slurry. The azeotropic vapors are withdrawn from the vessel, the solvent separated from the water, and the solvent returned to the vessel to replenish the level of slurry in the vessel. It is not necessary in the inventor's process to separate the water, fat and solvent from the separated liquid fraction, since the water and solvent are removed as vapor.

In some respects, the present invention differs materially from the process of Levin. The comminuted particles do not tend to coagulate in the solvent as in the Levin process. The alcohol solvent prevents coagulation. Further, wet fat particles are heavier than the solvent, and sink in the body of solvent rather than float on the surface as in the case of an ethylene dichloride solvent. The present invention utilizes agitation or stirring to maximize the surface contact of the solvent and the particles.

While alcohol forms an azeotrope with water, and the boiling point of the alcohol-water azeotrope is somewhat lower than the boiling point of water or alcohol, there is significantly less difference between the boiling points of the solvent and the azeotrope. Ethylene dichloride boils at 181° F., while a water-ethylene dichloride azeotrope boils at 160° F. Isopropyl alcohol on the other hand boils at approximately 181° F., but the water-isopropyl alcohol azeotrope boils at approximately 178° F. Accordingly, the sharp rise in temperature signifying completion of the dehydration process in the Levin apparatus is only an increase of approximately 3° in the present invention. Accordingly, completion of dehydration is more readily determined by measurement of the concentration of isopropyl alcohol in the vapor removed from the interior of the vessel, or by determination of the specific gravity of the alcohol and water portion of the slurry of particles, alcohol and water in the vessel.

It is also critical to the present invention that the volumetric ratio of isopropyl alcohol to water in the solvent introduced into the vessel be at least 95% and preferably 99%. As the particles are dehydrated in the vessel, the slurry formed of solvent and particles becomes a slurry of solvent, water and particles. The removal of solvent and water vappor from the vessel gradually reduces the amount of water present in the vessel, that water being divided between bound water within the particles and the free water in solution with the isoproppyl alcohol solvent. It is critical to the present invention that the free water in solution with the isopropyl alcohol be less than 8% by volume.

Figure 3:
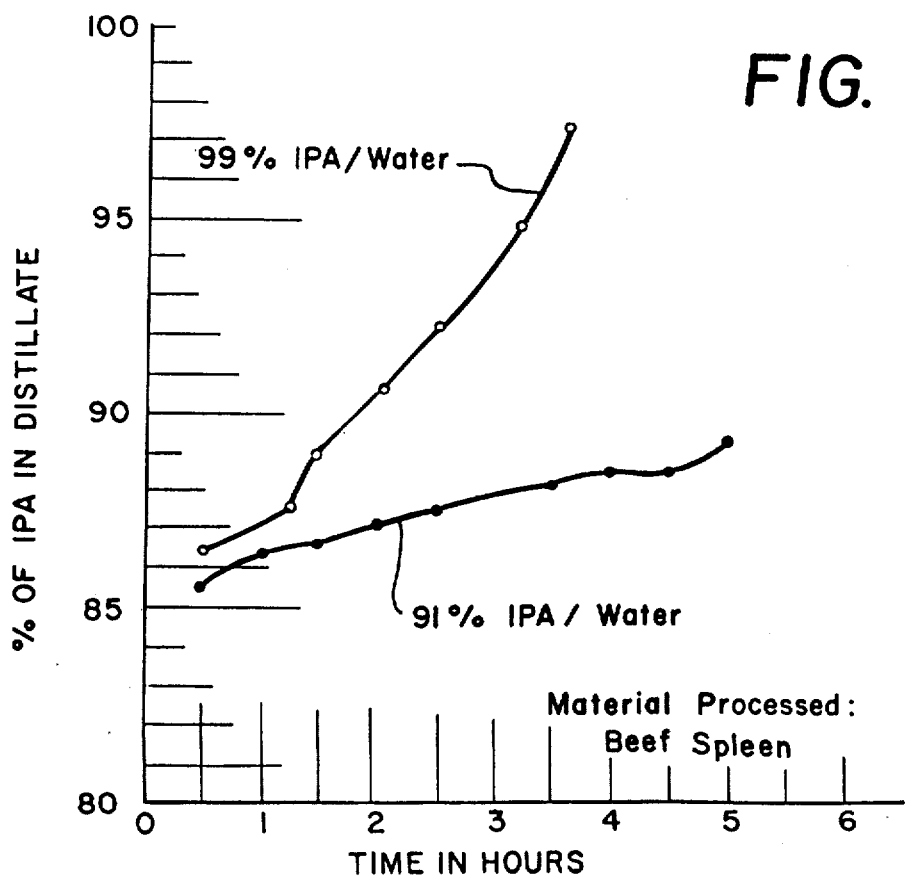
FIG. 3 is a graph illustrating the resuls of processing two samples under identical conditions except for the water content of an isopropyl alcohol solvent.

The criticalilty of the ratio of water to isopropyl alcohol cannot be explained based upo the solubility of protein, water solubles and fat in a mixture of isopropyl alcohol and water under boiling conditions. The solubility of both fat and protein does not change appreciably until the percentage of water in the mixture exceeds 20%. Further, the solubility of water solubles in a mixture of water and isopropyl alcohol increases gradually as the percentage by volume of water increases from zero to approximately 20% when extracting fish muscle. Experiments have shown that extraction according to the present invention with isopropyl alcohol solvents containing more than 5% water by volume results in a significantly reduced extraction efficiency and it becomes impractical to provide the heat necessary to remove the water from the comminuted tissue. FIG. 3 is a graph comparing the disiccation and defatting of a laboratory sample of spleen according to the present invention. In each case, approximately 500 grams of raw spleen were ground into fine particles and mixed into a slurry in a beaker with approximately two liters of isopropyl alcohol solvent. The beaker was heated, and the vapor produced in the beaker withdrawn to a condenser. The condenser was provided with a water cooled jacket, and the specific gravity of the condensate was periodically measured to determine the percentage of isopropyl alcohol to water in the condensate. When water is no longer present in large percentage in the condensate, the sample will be desiccated. In each case, the sample was placed under vacuum. and boiling occurred at approximately 33° C.

The lower curve of FIG. 3 sets forth the results of processing a sample of spleen with 91% isopropyl alcohol. The percentage of isopropyl alcohol in the distillate from a 500 gram sample of spleen is set forth from the beginning of the process for a period of five hours, and shows that the percentage of isopropyl alcohol increased through this period from the first measurement of 85.6% IPA taken approximately ½ hour after beginning the process to a final reading of 89.02% taken 5½ hours after the process began. The 500 grams of spleen yielded 98 grams of meat solids and contained a moisture content of 6.3% and quick fat of 2.44%. This product was achieved by utilizing three washes of 99% IPA to water by volume of 500 millimeters each at the end of the process in order to reduce the moisture of the product sufficiently.

On the other hand, the upper graph in FIG. 3 illustrates the results of processing a second sample of spleen of approximately 505 grams under similar conditions but utilizing a solvent of 99% isopropyl alcohol to water by volume. Azeotroping was completed in three hours and forty minutes, and the percentage of isopropyl alcohol to water increased during this period from 86.3% taken approximately ½ hour after commencing the process to 97.3% after three hours and forty minutes. The end product received two washes of 500 millimeters each of fresh 99% isopropyl alcohol to water by volume and resulted in a yield of 89.5 grams of meat solids, 3.1% moisture, and 1.48% quick fat. The dramatic improvement in extraction efficiency resulting from use of a solvent containing 99% isopropyl alcohol to water by volume over the same process using a solvent of 91% isopropyl alcohol to water by volume is apparent from FIG. 3. By other experiments, the inventor has found that the process described above can be carried out efficiently using a solvent consisting of at least 95% isopropyl alcohol to water, and that the efficiency of the azeotropic extraction process is materially degregated by use of a solvent having less than 95% isopropyl alcohol to water.

FIG. 1 illustrates schematically a suitable plant constructed according to the present invention. A vessel 10 is provided with a port 12 to receive raw material, the post 12 being located above the level 14 of a slurry 16 which partically fills the vessel 10. The vessel 10 is provided with a heater 18 in the form of a jacket, and the heater 18 provides heat to maintain the slurry 16 under boiling conditions.

The raw material is in the form of small particles of raw fat biological tissue, and those particles and an alcohol solvent comprise the slurry 16. In addition, the alcohol solvent forms a solution with water extracted from the tissue particles. The boiling condition of the slurry 16 causes vapor to form in the portion of the vessel 10 above the level 14 of the slurry, this region being designated 20. The vapors formed by the slurry are in the form of an azeotrope of alcohol and water, and the vessel is provided with an upper port 22 for removal of the vapors. A stirring device 24 extends down into the slurry 16 and is driven by a motor 26 located externally of the vessel 10.

The upper port 22 is connected to a condenser 28 which is provided with a cold water jacket not shown. The condenser has the function of converting the azeotropic vapors withdrawn from the vessel 10 through the upper port 22 to liquid form, and the condenser is connected to a used solvent tank 30. The used solvent tank 30 is connected to a high purity distillation system 32 which will be described in more detail hereinafter, and the distillation system 32 is effective to remove the water through an exit port 34 and to provide solvent through a second exit port 36. The solvent exiting through port 36 consists of alcohol with no more than 5% water by volume, and this exit port 36 is connected to a clean solvent resesrvoir 38. The clean solvent reservoir 38 is in turn connected to an upper inlet port 40 of the vessel 10 to replenish the solvent withdrawn from the slurry 16 by the vapors.

The apparatus of FIG. 1 is a batch system, and the apparatus thus far described is required for processing the raw material through the azeotropic cycle. When the vapors passing through the upper port 22 cease to contain significant amounts of water vapor, moisture from the raw material mixed in the slurry 16 has been substantially removed, and the material under treatment is ready for the next step. The vessel 10 is provided with a lower opening 42, which has a valve not shown, and is connected to an extractor/desolventizer 44. When the azeotroping process is completed, the heater 18 is turned off, and the slurry 16 is dumped through the lower opening 42 into the extractor/desolventizer 44 through a produce opening 46. The extractor/desolventizer 44 also has an upper solvent opening 48, and this is connected to the clean solvent tank 38. The extractor/desolventizer also has a drain opening 50 for removal of liquids from the extractor/desolventizer, and a lower product opening 52 for removal of processed tissue solids.

After the slurry 16 is dumped into the extractor/desolventizer 44, the liquid portion thereof is drained through the drain 50 to the evaporator 54. Also, clean solvent is introduced through the solvent opening 48 to wash the solids from the slurry now located in the extractor-desolventizer 44. The solvent from the clear solvent tank 38 also is drained through the drain 50 and conducted to the evaporator 54. Heat is applied in the extractor/desolventizer 44 to dry the solid particles, and when the particles are dry, they are removed through the finished product opening 52.

The evaporator 54 receives from the extractor/desolventizer 44 a liquid flow of fat and solvent, the water having been removed as an azeotrope by the cooker 10. The evaporator applies heat to evaporate the solvent from the fat, and the evaporator has a drain 56 to remove the fat. Likewise, the evaporator 54 has an upper opening 58 through which solvent vapors flow to a condenser 60. The condenser 60 transforms the solvent vapors to liquid state, and the condenser 60 is connected to the clean solvent tank 38.

The heat is applied to the solid particles in the extractor/desolventizer 44 in the final drying stages, the solvent associated with the solid particles is evaporated, and conducted from the extractor/desolventizer through an exit port 62 to a condenser 64. The condenser 64 transforms the vapors to liquid form, and the liquid solvent is conducted to the clean solvent tank 38.

When defatting and dehydrating certain tissues such as pancreas for food or pharmaceutical values, it is desirable to limit the temperature of the pancreas particles during the process. Accordingly, a vacuum pump 66 is connected to the region 20 of the vessel 10 through the condenser 28. The vacuum pump 66 exhausts gases present in the condenser 28 to the atmosphere to reduce the pressure of the region 20 and to permit boiling to occur in the slurry 16 at a temperature lower than the atmospheric boiling point.

Figure 2:
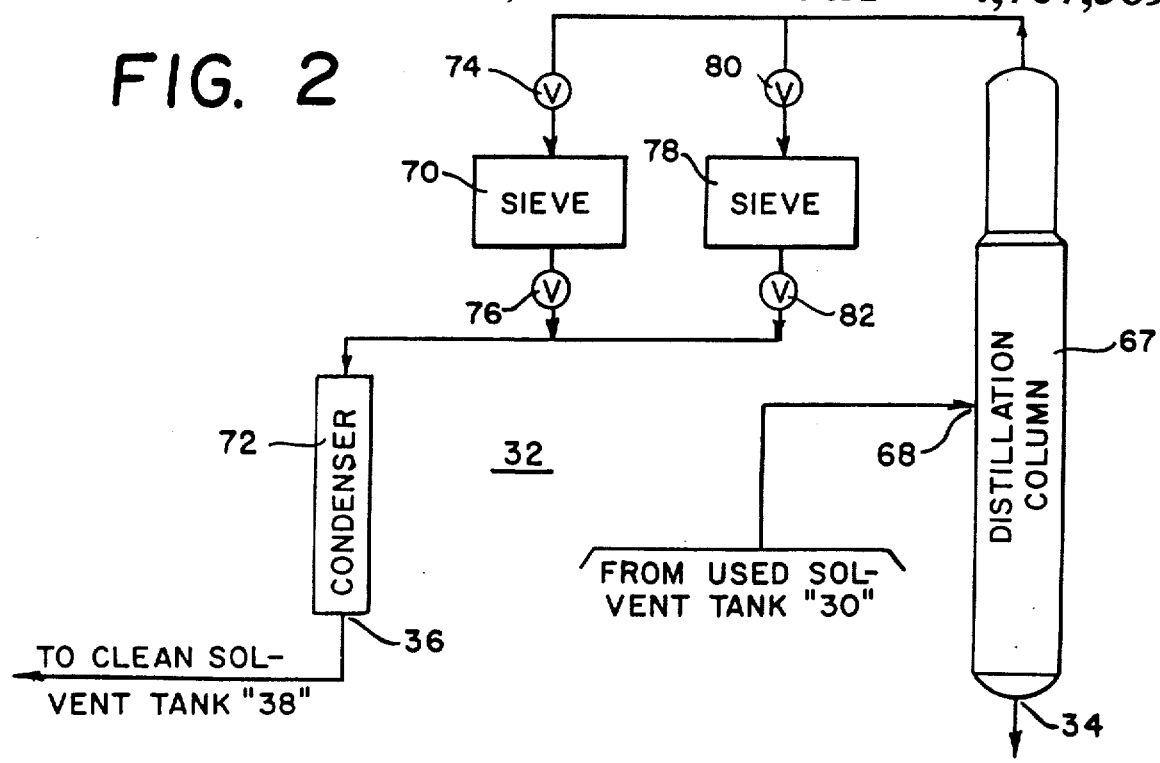
FIG. 2 is a fragmentary view of the high purity distillation system illustrated in FIG. 1.

The vapors developed through boiling of the slurry 16 contain a fixed prportion of solvent vapors and water vapors according to the alcohol/water vapor-liquid equilibrium curve. In the case of a mixture of isopropyl alcohol and water, about 87% of the vapors are isopropyl alcohol and 3% of the vapors are water. Hence, it is necessary to employ some system other than distillation, since the water-solvent mixture will always come off as an azeotrope with the same proportion of solvent to water. FIG. 2 illustrates the high purity distillation system 32 for achieving this purification.

The water solvent solution from the used solvent tank 30 is introduced into a distillation column 67 through a port 68. The distillation column 67 reconverts the vapors from the cooker or vessel 10 from liquid form to vapor form, and the vapors from the distillation column pass through a molecular sieve 70 which traps and removes water vapor while passing solvent vapors. Molecular sieves are commercially available and can be utilized to purify isopropyl alcohol to approximately 99% isopropyl alcohol and 1% water. Othe processes for purification also exist, such as salting out with sodium chloride, sodium sulfate, sodium hydroxide. The purified water vapors are thereafter condensed in a condenser 72 and delivered through the port 36 to the clean solvent reservoir 38. Because of the fact that the sieve 70 will become saturated with water vapor, it is provided with valves 74 and 76 to remove it from the system, and a second molecular sieve 78 is connected in parallel with the sieve 70 through valves 80 and 82. The saturated molecular sieve may be rejuvenated and returned to service.

The used solvent tank 30 functions to isolate the portion of the system operated at subatmospheric pressures, namely the cooker or vessel 10 and condenser 28, from the high purity distillation system. It is possible to eliminate the used solvent tank 30 and the distillation column 67, and directly impress the vapors from the region 20 of the vessel 10 on the molecular sieve 70 or 78.

EXAMPLE 1

As an example, 4,000 lbs. of raw bovine pancreas was desiccated and dehydrated with a solvent consisting of 99% isopropyl alcohol and 1% water under vacuum to produce a desiccated and defatted ground meal containing less than 5% moisture and 2% fat. Raw beef pancreas was obtained frozen in 60 lb. boxes at 0° F. The pancreas was allowed adequate time to thaw just enough that it could be removed easily from the boxes in block form and was thereafter ground through a prebreaker equipped with a coarse grinding plant. The meat was then ground a second time to make a puree of the frozen meat, and thereafter mixed until it warmed enough to be easily pumped into the apparatus illustrated in FIG. 1.

The vessel 10 was filled to the level 14 with 750 gallons of solvent consisting of 99% isopropyl alcohol and 1% water. The water jacket on the condenser 28 as placed in operation and the vacuum pump 66 was used to reduce the pressure within the region 20 of the vessel 10 to approximately 26 inches of mercury in order to produce a boiling point of approximately 37° C. The heater 18 was activated, and when the solvent in the vessel 10 commenced boiling, the entire 4,000 lbs. of beef pancreas was pumped through the port 12 into the vessel 10.

As soon as the slurry 16 of pancreas particles, solvent and water reached boiling, azeotropic vapors were withdrawn from the region 20 above the level of the slurry 16 through the upper port 22 and condensed to liquid form in the condenser 28. The condensate from the condenser 28 was collected in the used solvent tank 30. Fresh solvent was withdrawn from the clean solvent tank 38 and introduced through the port 40 to maintain the level 14 of slurry 16 in the vessel 10 at the same level. Azeotroping continued until approximately 3,000 gals. of solvent had been distilled and condensed by the condenser 28, at which time the product in the slurry 16 contained approximately 10% moisture. Thereafter, the heater 18 was deactivated, and the vacuum released. The entire slurry 16 was dropped through the lower opening 42 by opening a valve to the extractor/desolventizer 44. The liquid fraction of the slurry 16 containing principally isopropryl alcohol and fat was then drained off of the solid fraction in extractor/desolventizer 44, and the drained fraction transported through the drain 50 to the evaporator 54. The evaporator 54 heater coils were energized, and the evaporator evaporated the solvent from the fat. The condenser 60 was placed in operation on actuation of the evaporator heater, and condensed the vapor solvent, which is relatively pure isopropyl alcohol, and returned it to the clean solvent tank 38. The fat was withdrawn from the drain 56 of the evaporator and may be further processed or utilized.

The solid particles of the sample in the extractor/desolventizer 44 were then washed with additional solvent and subjected to heat to drive off solvent in vapor form from the particles. The solvent vapors passed through the port 62 and were condensed in the condenser 64 and returned to the clean solvent tank 38. The dried solid particles were then removed through the finished product opening 52. Analysis of the particles indicated a yield of meal solids of 16.6% of the batch by weight, a fat recovery of 30.98% of the batch by weight, residual moisture of 2.1% and residual fat of 0.48%.

The high purity distillation system 32 was actuated on completion of the foregoing sample to return the used solvent from the used solvent tank 30 to the clean solvent tank 38. The high purity distillation system could also be operated during the azeotrope process.

In addition to the foregoing example, beef spleen, beef heart, and beef liver may be processed according to the foregoing example. The foregoing process is also suitable for processing whole ground fish or parts thereof, ground fowl, and all types of ground animal tissue.

The present invention may be practiced with other water miscible liquid solvents that form an azeotrope with water. Low aliphatic alcohols such as isopropyl alcohol, ethyl alcohol and tertiary butyl alcohol are particularly suitable solvents.

EXAMPLE 2

Ethyl alcohol may be substituted for isopropyl alcohol in Example 1. 4,000 lbs of raw bovine pancreas was desiccated and dehydrated with a solvent consisting of 99% ethyl alcohol and 1% water under vacuum to produce desiccated and defatted ground meal containing less than 5% moisture and 2% fat. The vessel 10 was filled to the level 14 with 750 gallons of solvent consisting of 99% ethyl alcohol and 1% water. The 4,000 pounds of raw bovine pancreas, obtained frozen, was broken up and ground in the manner described in Exhibit 1. The water jacket on the condenser 28 was placed in operation and the vacuum pump 66 was used to reduce the pressure within the region 20 of the vessel 10 to approximately 26 inches of mercury in order to produce a boiling point of approximately 34.8 degrees C., and the above description with respect to Example 1 applies equally to Example 2.

Analysis of the particles indicated a yield of meal solids of 15.8% of the batch by weight, a fat recovery of 25.1% of the batch by weight, residual moisture of 2.3% by weight, and residual fat of 0.76% by weight.

EXAMPLE 3

A solvent consisting of tertiary butyl alcohol and water was utilized to desiccate and dehydrate raw bovine liver. 4,000 lbs. of raw bovine liver, obtained frozen, was broken up and ground in the manner described with respect to Example 1. The vessel 10 was filled to the level 14 with 750 gallons of solvent consisting of 99% tertiary butyl alcohol and 1% water. The water jacket on the condenser 28 was placed in operation and the vacuum pump 66 was used to reduce the pressure within the region 20 of the vessel to approximately 26 inches of mercury in order to produce a boiling point of approximately 37.4 degrees centigrade, and the above description with respect to Example 1 applies equally to Example 3.

Analysis of the particles indicated a yield of meal solids of 16.8% of the batch by weight, a fat recovery of 28.3% of the batch by weight, residual moisture of 2% by weight, and residual fat of 0.38% by weight.

Those skilled in the art will devise many modifications of the foregoing processes and apparatus and many applications for the present invention beyond that here disclosed. It is therefore intended that the scope of the present invention be not limited by the foregoing disclosure, but rather only by the appended claims.

The invention claimed is:

1. The process of simultaneously desiccating and defatting fat biological tissue containing in excess of 20% water by weight comprising the steps of comminuting the wet fat biological tissue, thereafter introducing the comminuted tissue into a body of solvent disposed within a vessel to form a slurry of solvent, comminuted tissue and water, the solvent consisting of a mixture of low aliphatic alcohol and water, said mixture having less than 5% water by volume, heating the body of slurry to establish boiling conditions and to produce an azeotropic vapor of solvent and water in the vessel, maintaining the slurry under boiling conditions for a period of time to reduce the water content of the comminuted tissue, withdrawing the azeotrope vapor from the vessel during said period of time, recovering the solvent from the azeotrope of water and solvent, and returning the solvent to the vessel.

2. The process of claim 1 wherein the slurry is removed from the vessel and the slurry is separated into a solid fraction consisting of the defatted and dehydrated comminuted tissue and a liquid fraction.

3. The process of claim 2 wherein the liquid fraction is separated into fat and solvent.

4. The process of claim 1 wherein the solvent consists of at least 99% alcohol and not more than 1% water by volume.

5. The process of claim 1 wherein the solvent consists of isopropyl alcohol and water.

6. The process of claim 1 wherein the solvent consists of ethyl alcohol and water.

7. The process of claim 1 wherein the solvent consists of tertiary butyl alcohol and water.

8. The process of claim 1 wherein the vessel is operated under a pressure less than atmospheric pressue to produce boiling of the slurry at a temperature lower than its atmospheric boiling point.

9. The process of claim 1 wherein the step of recovering the solvent from the azeotrope vapor of water and solvent includes the steps of absorbing water vapor from the vaporous solvent and water azeotrope to increase the ratio of solvent to water in the vapor, and thereafter condensing the vapor to produce a liquid with a higher ratio of solvent to water than the solvent-water azeotrope of that solvent.

10. The process of claim 9 wherein the step of recovering the solvent from the azeotropic vapor of water and solvent includes the steps of condensing the azeotropic vapor to produce a condensate of solvent and water, evaporating the condensate to atmospheric pressure to produce a condensate vapor consisting of an azeotrope of solvent and water, thereafter absorbing water vapor from the condensate vapor, and therafter condensing the treated condensate vapor.

* * * * *

UNITED STATES PATENT AND TRADEMARK OFFICE
CERTIFICATE OF CORRECTION

PATENT NO. : 4,707,369

DATED : November 17, 1987

INVENTOR(S) : Arnold Suresky

It is certified that error appears in the above-identified patent and that said Letters Patent is hereby corrected as shown below:

Column 1, line 31 delete "disiccated" and insert --desiccated--;

Column 1, line 41 before "FATTY" delete "OR" and insert --OF--;

Column 2, line 4 delete "therafter" and insert --thereafter--;

Column 2, line 6 before "process" delete "this" and insert --This--;

Column 2, line 10 delete "ispropanol" and insert --isopropanol--;

Column 2, line 24 delete "DEODORINZING" and insert --DEODORIZING--;

Column 2, line 47 delete "Concentrates"," and insert --Concentrates,"--;

Column 2, line 58 before "proportion" delete "as" and insert --a--;

Column 2, line 67 delete "disadvantags" and insert --disadvantages--;

Column 3, line 4 delete "still a" and insert --a still--;

Column 3, line 6 delete "bioloical" and insert --biological--;

Column 3, line 38 delete "resuls" and insert --results--;

Column 4, line 26 delete "vappor" and insert --vapor--;

UNITED STATES PATENT AND TRADEMARK OFFICE
CERTIFICATE OF CORRECTION

PATENT NO. : 4,707,369

DATED : November 17, 1987

INVENTOR(S) : Arnold Suresky

It is certified that error appears in the above-identified patent and that said Letters Patent is hereby corrected as shown below:

Column 4, line 30 delete "isoproppyl" and insert --isopropyl--;
Column 4, line 33 delete "criticalilty" and insert--criticality--;
Column 4, line 34 delete "upo" and insert--upon--;
Column 4, line 49 delete "disiccation" and insert--desiccation--;
Column 4, line 62 delete "vacuum" and insert--vacuum,--;
Column 5, line 40 delete "partically" and insert --partially--;
Column 6, line 2 delete "resesrvoir" and insert --reservoir--;
Column 6, line 10 before "moisture" insert--the--;
Column 6, line 19 delete "produce" and insert--product--;
Column 6, lines 30 and 31 after "extractor" delete "-" and insert--/--;
Column 6, line 31 delete "clear" and insert--clean--;
Column 6, line 47 before "heat" delete "The" and insert--When--;
Column 6, line 65 delete "prportion" and insert--proportion--;
Column 7, line 16 delete "Othe" and insert--Other--;

UNITED STATES PATENT AND TRADEMARK OFFICE
CERTIFICATE OF CORRECTION

PATENT NO. : 4,707,369

DATED : November 17, 1987

INVENTOR(S) : Arnold Suresky

It is certified that error appears in the above-identified patent and that said Letters Patent is hereby corrected as shown below:

Column 7, line 46 delete "plant" and insert--plate--;

Column 7, line 53 delete "as" and insert--was--;

Column 8, lines 63 and 64 delete "Exhibit" and insert--Example--;

Column 10, line 42 delete "therafter" and insert --thereafter--.

Signed and Sealed this

Fourteenth Day of June, 1988

Attest:

DONALD J. QUIGG

*Attesting Officer*   *Commissioner of Patents and Trademarks*